United States Patent
Schaefer

(10) Patent No.: US 8,690,132 B2
(45) Date of Patent: Apr. 8, 2014

(54) HYDRAULICALLY DAMPING ENGINE MOUNT

(75) Inventor: Christof Schaefer, Sinzig (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 115 days.

(21) Appl. No.: 13/502,681

(22) PCT Filed: Dec. 13, 2010

(86) PCT No.: PCT/DE2010/050089
§ 371 (c)(1),
(2), (4) Date: Apr. 18, 2012

(87) PCT Pub. No.: WO2011/072666
PCT Pub. Date: Jun. 23, 2011

(65) Prior Publication Data
US 2012/0205846 A1    Aug. 16, 2012

(30) Foreign Application Priority Data

Dec. 17, 2009 (DE) .......................... 10 2009 054 881

(51) Int. Cl.
*F16F 5/00* (2006.01)
(52) U.S. Cl.
USPC ................................. 267/140.13; 267/140.11
(58) Field of Classification Search
USPC ............. 267/140.13, 140.11, 140.12, 140.14, 267/140.15
See application file for complete search history.

(56) References Cited

U.S. PATENT DOCUMENTS 3,107,953 A * 10/1963 Palm .............................. 384/153
6,032,935 A * 3/2000 Mizutani et al. ........... 267/140.11
6,082,721 A     7/2000 Kingsley
6,485,005 B1 * 11/2002 Tewani et al. ............. 267/140.13
7,458,565 B2 * 12/2008 Miyahara .................. 267/140.11
7,837,184 B2 * 11/2010 Miyahara .................. 267/140.13
8,157,251 B2 * 4/2012 Tanaka et al. .................. 267/141
8,231,116 B2 * 7/2012 Nishi ........................ 267/140.13
8,246,021 B2 * 8/2012 Shand et al. .............. 267/140.13

FOREIGN PATENT DOCUMENTS

EP     1 382 881 A2    1/2004
WO     WO 2009/096378 A1    8/2009

OTHER PUBLICATIONS

International Search Report issued PCT/DE2010/050089 on Apr. 8, 2011.

* cited by examiner

*Primary Examiner* — Thomas J Williams
*Assistant Examiner* — Mariano Sy
(74) *Attorney, Agent, or Firm* — Cohen & Hildebrand, PLLC

(57) ABSTRACT

A hydraulically damping axial mount includes a housing with an elastomeric support spring with an insertion part, a mount core part extending in axial direction (a) in the housing and supported by a support spring, and two chambers arranged underneath one another in axial direction (a) for fluidic damping. A working chamber and an equalization chamber are spatially separated by a channel unit and are hydraulically coupled with one another by a channel. One or several insertion parts which are partially covered by the elastomer of the support spring and reinforce the support spring are inserted in the elastomeric support spring. The support spring is secured in the housing by a thread pitch, formed on the outside contour of the elastomeric support spring in the circumferential direction (u) of the elastomeric support spring and brought into engagement with a corresponding inside contour of the housing during installation of the mount.

13 Claims, 4 Drawing Sheets

HYDRAULICALLY DAMPING ENGINE MOUNT

This is an application filed under 35 USC §371 of PCT/DE2010/050089, claiming priority to DE 102009 054 881.5 filed on Dec. 17, 2009.

BACKGROUND OF THE INVENTION

The invention relates to an axial mount, such as a unit mount or engine mount, with hydraulic damping. More particularly, the invention relates to a special embodiment of the outside contour of the support spring of such axial mount.

Mounts of this type are used in the automotive industry for supporting the engine and the transmission to attenuate vibrations caused by these units and to prevent transmission of the vibrations to the passenger compartment. The mounts include a mount core part, an elastomeric support spring and a housing which receives the mount core part and the support spring, wherein the mount core part is supported on the support spring arranged between the mount core part and the housing. For implementing the hydraulic damping, corresponding mounts include two chambers superpositioned in the axial direction for receiving a fluidic damping means. The chambers, namely a working chamber and an equalization chamber, are spatially separated by a channel unit; however, they are hydraulically coupled with one another by way of a channel formed in this channel unit. The elastomeric support spring is reinforced for mechanical stabilization by one or more metallic or plastic elements.

To be able to absorb the forces in the main loading direction present in an intended application, here the axial direction, the support spring of these mounts is secured on the housing against axial displacement. The support spring may be connected with the housing through vulcanization or may be formfittingly secured on the housing with an additional separate component in a joining process. In the first-mentioned situation, the vulcanization on the housing and/or its inside is disadvantageously accompanied by a loss of molding capacity, meaning that the molds used for producing the elastomeric support spring must have a slightly larger volume because the housing is also inserted in the molds. On the other hand, when using the already mentioned separate component for securement, a separate joining process is required in addition to the additional component during production, which increases the manufacturing costs. In addition, the separate component may for geometric reasons frequently not be secured along the entire circumference of the support spring, so that the corresponding joint may not withstand the constant load of the engine weight or unit weight during extended use of the mount.

BRIEF SUMMARY OF THE INVENTION

It is therefore an object of the invention to provide a hydraulically-damping unit mount which eliminates the aforementioned disadvantages by having a particularly simple construction and obviating the need for vulcanization of the support spring on the housing.

The object is attained by a mount having the features of claim 1. Advantageous embodiments and modifications are recited in the dependent claims.

The hydraulically-damping unit mount proposed for attaining the object is constructed in a known manner and consists of a housing that is preferably closed on one side by a cover, includes a support spring, a mount core part extending in the axial direction in the housing and supported by the support spring, and two chambers superpositioned in the axial direction for a fluidic damping means. The chambers, namely a working chamber and an equalization chamber spatially separated from the working chamber by a channel unit, are coupled with one another by a channel formed in the channel unit. The working chamber is hereby enclosed by the support spring with the mount core part and the channel unit, whereas the equalization chamber is enclosed by the channel unit and an elastic bellow arranged between the channel unit and a side of the channel unit facing away from the working chamber, and/or by the channel unit and the bellow arranged between the channel unit and the preferably provided cover of the housing. One or more insertion parts are inserted in the elastomeric spring, which are at least partially covered by the elastomer of the spring, thus reinforcing or mechanically stabilizing the spring.

However, according to the invention, the support spring is held on the housing neither by vulcanization nor by a joint provided by deforming the housing. Instead, a thread pitch is arranged on the outside contour of the support spring in its circumferential direction, which is brought into engagement with a corresponding inside contour of the housing during installation of the mount. The support spring and the housing are hereby brought into engagement such that the elastomeric skin of the support spring is pretensioned in the axial and the radial direction to eliminate noise when the mount is used for the intended purpose.

Because the support spring need not be connected with the housing by vulcanization, the actual mount, namely the support spring and the mount core part supported by the support spring, can be vulcanized independent of the housing and thus be prefabricated as a modular unit. At the same time, the required molding capacity is advantageously reduced, unlike with conventional unit mounts, where the support spring is held on the inside of the housing by vulcanization. Because an additional separate part for securing the support spring and the housing with a joint is no longer required, the mount can be constructed with a reduced number of separate components, thus attaining weight/cost savings while gaining installation space. With the particular manner for securing the support spring in the housing and the already mentioned modular construction of the support spring, very flexible axial mounts with different usage characteristics can be provided by forming different combinations of mount housing and support spring, i.e. rubber-metal part or rubber-plastic part.

When previously or hereinafter reference is made to a rubber-metal part or rubber-plastic part, it will be assumed that typically rubber is used for the elastomeric part of the support spring. However, other elastomeric materials may also be used, such as silicone, which also applies for the unit mount according to the invention. Accordingly, a more accurate but less common term would be an elastomer-metal part or an elastomer-plastic part. Therefore, unless mentioned otherwise, the terms rubber-metal part and rubber-plastic part as well as elastomer-rubber part and elastomer-plastic part are used synonymously. The same applies to coating the insertion parts(s) reinforcing the support spring and the outside contour in the region of the thread pitch with rubber, and to rubber-coating the aforementioned parts or regions, which can therefore refer to coating with an elastomer, for example rubber.

Advantageously, the thread pitch of the support spring is at least partially reinforced inwardly, meaning in the direction of the axial center axis of the support, by the aforementioned insertion part which has a commensurate geometry. This enhances, on one hand, the mechanical stability of the support spring in this region. It is also advantages in production, because the thread pitch can be introduced with a so-called slider operating laterally from the outside inwardly, with the reinforcement operating as interior support for generating the required counterpressure. Moreover, the outside contour of the support spring is completely rubber-coated in the region of the thread pitch, whereas in other regions the reinforcing insertion part may also protrude outwardly in relation to the elastomer of the support spring. Forming a complete rubber-coating in the region of the pitch prevent the generation of undesired noise due to the unavoidable relative motion between the support spring and the housing during the intended use of the mount. An additional decoupling is hence achieved in conjunction with the joint according to the invention. In a way, an additional spring is thereby formed which more or less dampens and/or insulates depending on the pretension, the Shore hardness and the layer thickness. Advantageously, the insertion part which also reinforces the support spring in the region of the thread pitch according to the invention is completely rubber-coated, i.e. vulcanized into the elastomer of the support spring.

Preferably, the elastomeric support spring has on the side of its axial end facing away from the preferably provided cover a slightly radially outwardly protruding hill-shaped protrusion which moves into a corresponding collar disposed on the housing when the support spring is fully inserted in the housing. In general, a unit mount has no torsional loads when used as intended. However, the aforementioned hill-shaped protrusion additionally secures the support spring from being unscrewed from the housing of the mount. Alternatively, the support spring can also be secured by radially deforming the insertion part that reinforces the support spring or the housing towards the mount axis after the support spring has reached its end position during the joining operation, i.e. after the support spring is screwed into the housing. In the last-mentioned alternative, a deformation of the insertion part is preferred, because the insertion part is preferably rubber-coated or coated with the elastomer of the support spring, thus eliminating corrosion problems are even following a corresponding, mechanical deformation. Preferably, the mount may include an axial stop for positioning the support spring when the support spring is screwed into the housing in the axial direction.

Depending on the intended application of the mount and the desired damping characteristics, the channel unit and the channel formed in the channel unit may be configured differently. In a practical embodiment, the channel may be formed as a continuous flow channel extending around the circumference of the channel unit. In another possible embodiment, the channel unit may be formed as a nozzle plate and the channel may be formed as a nozzle channel or damping channel extending through this nozzle plate in the axial direction. The support spring is preferably wetted on its outside contour with a lubricant, for simplifying insertion into the housing, i.e., when the support spring is screwed into the housing. In this context, it will be assumed that the lubricant diffuses out of the mount after the mount is assembled or during its intended use, producing an adhesive effect in the regions of the outside contour of the support spring previously wetted with a lubricant, which may also help secure the support spring with respect to its axial position in the housing, meaning preventing the support spring from being unscrewed.

The fluidic damping means may optionally be introduced simultaneously into the mount when forming the support spring and the two chambers formed in the support spring. Alternatively, the damping means may be introduced into the support spring or its chambers at a later time. According to one embodiment, the rubber-metal part or rubber-plastic part formed by the reinforced support spring has on its circumference at least two radially oriented through-openings for filling damping means. It would also be possible to provide a corresponding bore in the mount core part for filling damping means.

The thread pitch on the outer contour of the support spring and the corresponding inner contour of the housing are preferably constructed such that an overlap of about 2 mm exists on each side between the support spring and the housing over the entire circumference of the mount in the axial direction. However, the thread pitch may also only be formed on part of the circumference of the support spring with an overlap of about 1 mm. Formation of a thread pitch extending around the entire circumference with an overlap of up to 2 mm then increases the axial load-carrying capacity. According to this preferred embodiment, the support spring is then securely held in the housing even at high axial loads.

According to a preferred embodiment of the invention, the channel unit is held by an inwardly oriented collar of the insertion part that reinforces the support spring. The respective collar is formed by deforming an end of this insertion part protruding from the housing on the side of the cover in the axial direction. Alternatively, the channel unit may be held between the support spring and a pre-mounted cover.

Again, depending on the application of the mound, the housing of the mount may be formed as a flange housing with a flange having openings for attaching the mount at its installation location. While the outer part that reinforces the support spring may be made of metal or plastic, the mount core part and the housing are preferably formed of metal to provide stability. However, the mount core part may also be formed as a plastic part or a threaded metal insert. The cover which preferably closes the housing may also be made either of metal or of plastic. Preferably, the side of the mount facing away from the bellow forming the equalization chamber and/or from the cover may also be covered with a cap, with the cap protecting the support spring from water and incoming dirt.

BRIEF DESCRIPTION OF THE DRAWINGS

The invention will now be described again in more detail with reference to exemplary embodiments in comparison with the state-of-the-art. The drawings show in.

DETAILED DESCRIPTION OF TH DRAWINGS

Figure 1:
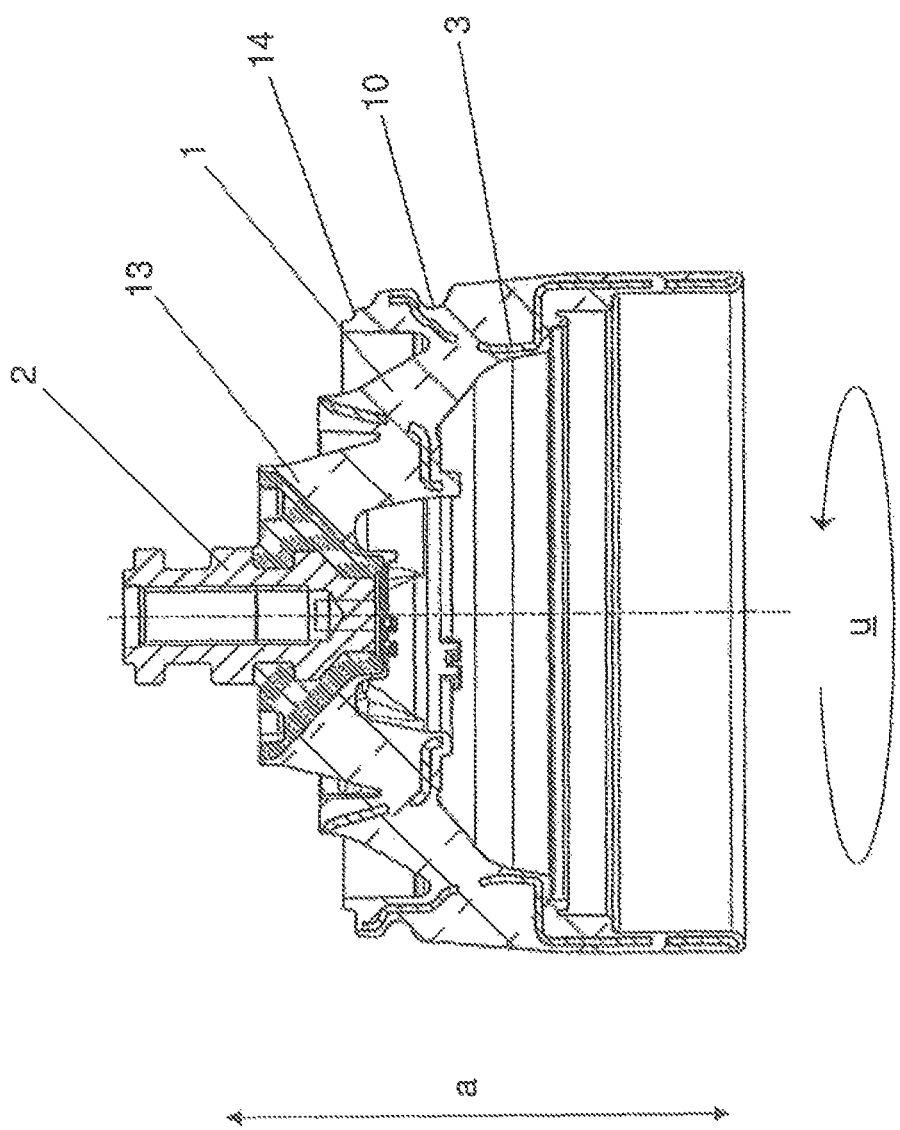
FIG. 1 a possible embodiment of the support spring of the unit mount according to the invention, FIG. 2 a possible embodiment of the unit mount with the support spring received in the housing, FIG. 3 an alternative embodiment of the unit mount according to the invention which is different from FIG. 2, and FIG. 4 a generic unit mount according to the state-of-the-art.

FIG. 1 shows a possible embodiment of the support spring 1 of the unit mount according to the invention with the mount core part 2 supported by the support spring 1 in a cross-sectional view with respect to the axial direction a. The support spring 1 is constructed as a substantially cylindrical elastomeric or rubber part, which is tapered on the side of its axial end 13 in form of a truncated cone, with the mount core part 2 protruding into the support spring 1 on this side and being supported on the walls which are inclined towards each other in this region. The corresponding rubber part forming the support spring 1 is reinforced by an insertion part 3 made of metal and vulcanized into the elastomer. According to the invention, a thread pitch 10 which extends once in the circumferential direction u around the circumference of the outside contour of the support spring is formed below the section that is tapered in form of a truncated cone, i.e. in the substantially cylindrical section. According to the invention, this thread pitch 10 is brought into engagement with a corresponding contour of the inner surface of the housing 4 (see FIG. 2) during assembly of the mount. The illustrated rubber-metal part forming the support spring 1 may include an unillustrated through-opening, by which fluidic damping means may be introduced into the already preinstalled rubber-metal part or rubber-plastic part.

Figure 2:
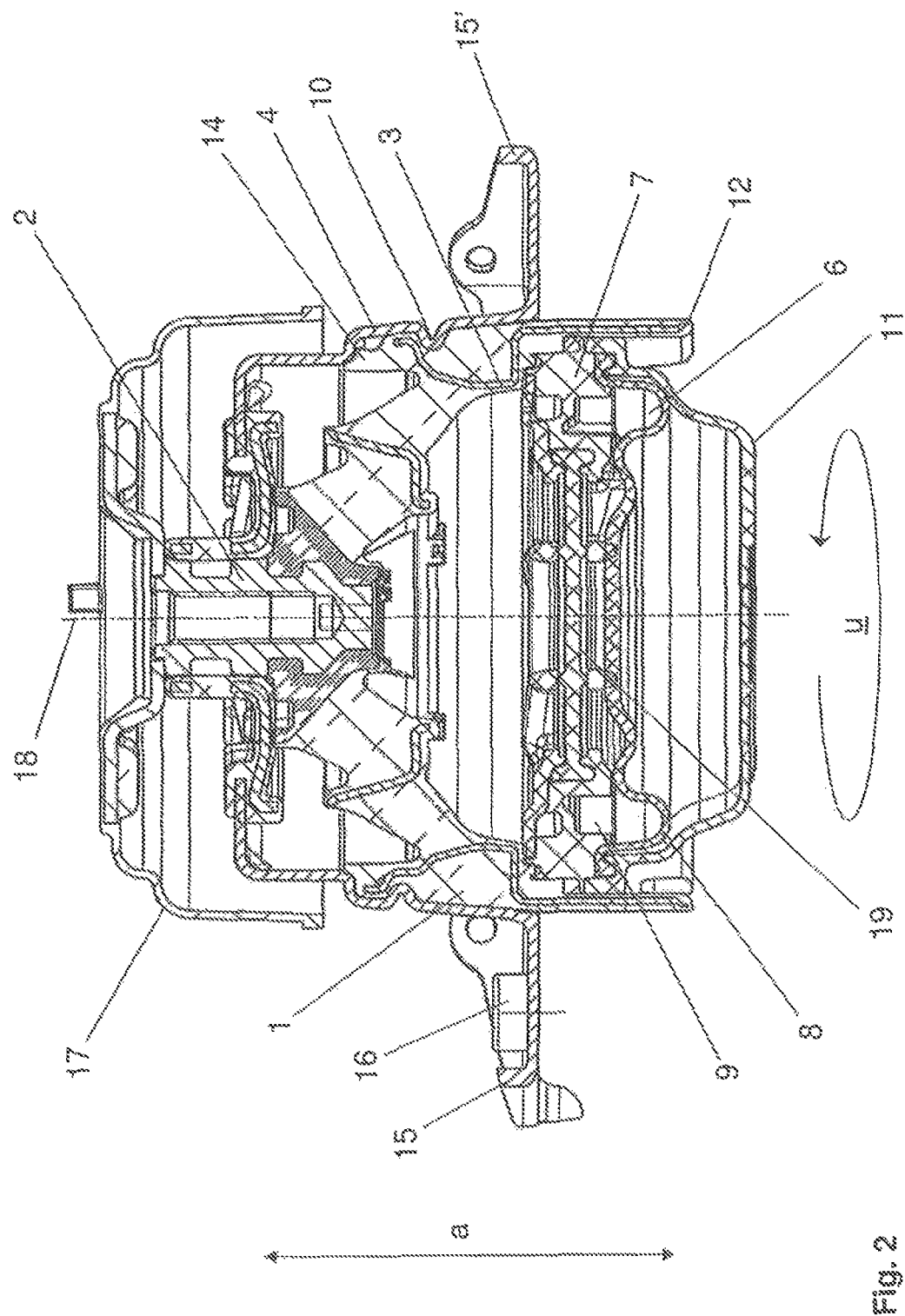

FIG. 2 shows also in an axial cross-sectional diagram a first possible embodiment of the unit mount according to the invention, wherein the support spring 1 is already inserted in the housing 4, meaning that the thread pitch 10 is already brought into engagement with the corresponding inside contour of the housing 4. A hill-shaped protrusion 14 formed on the side of the axial end 13 on the outside contour of the support spring 1 has moved into a corresponding bulge of the insertion part 3, so that the support spring 1 is additionally secured against being accidentally unscrewed due to corresponding loads and/or against being moved upwardly out of the housing 4 in the axial direction a when using the mount. The chambers 5, 6 formed in the housing 4, namely the working chamber 5 which is disposed below the mount core part 2 supported by the support spring 1, and the equalization chamber 6 which is separated from the working chamber 5 by the channel unit 7 can be readily identified in the diagram. As can be seen, the working chamber 5 is enclosed by the support spring 1 with the mount core part 2 and the channel unit 7, whereas the walls of the equalization chamber 6 are formed by the channel unit 7 and an elastic bellow 8 arranged between the channel unit 7 and the also recognizable cover 11. The working chamber 5 and the equalization chamber 6 are hydraulically coupled with one another via the flow channel 9 formed in the channel unit 7, allowing the fluid received by the working chamber 5 to flow into the equalization chamber 6 through the channel 9 when the mount is loaded, thereby expanding the equalization chamber 6 and/or the bellow 8. A membrane 19, which prevents hardening of the mount and hence transmission of acoustic vibrations under high-frequency loads, is embedded in the channel unit 7. The housing 4 of the mount is constructed as a flange housing, so that the mount can be attached with screws to other parts at a specific installation location using openings 16, 16' disposed in the flange 15, 15'. In the embodiment illustrated in FIG. 2, the channel unit 7 is held by a collar of the insertion part 3 that reinforces the support spring 1. For this purpose—which has not been done up to this point—the end 12 of the insertion part 3 protruding from the housing is radially inwardly deformed, namely angled in the direction of the mount axis 18. The insertion part 3 reinforcing the support spring 1 is completely rubber-coated in the illustrated mount. The mount is covered with a cap 17 to protect the support spring 1 against water and/or dirt on the side facing the cover 11.

Figure 3:
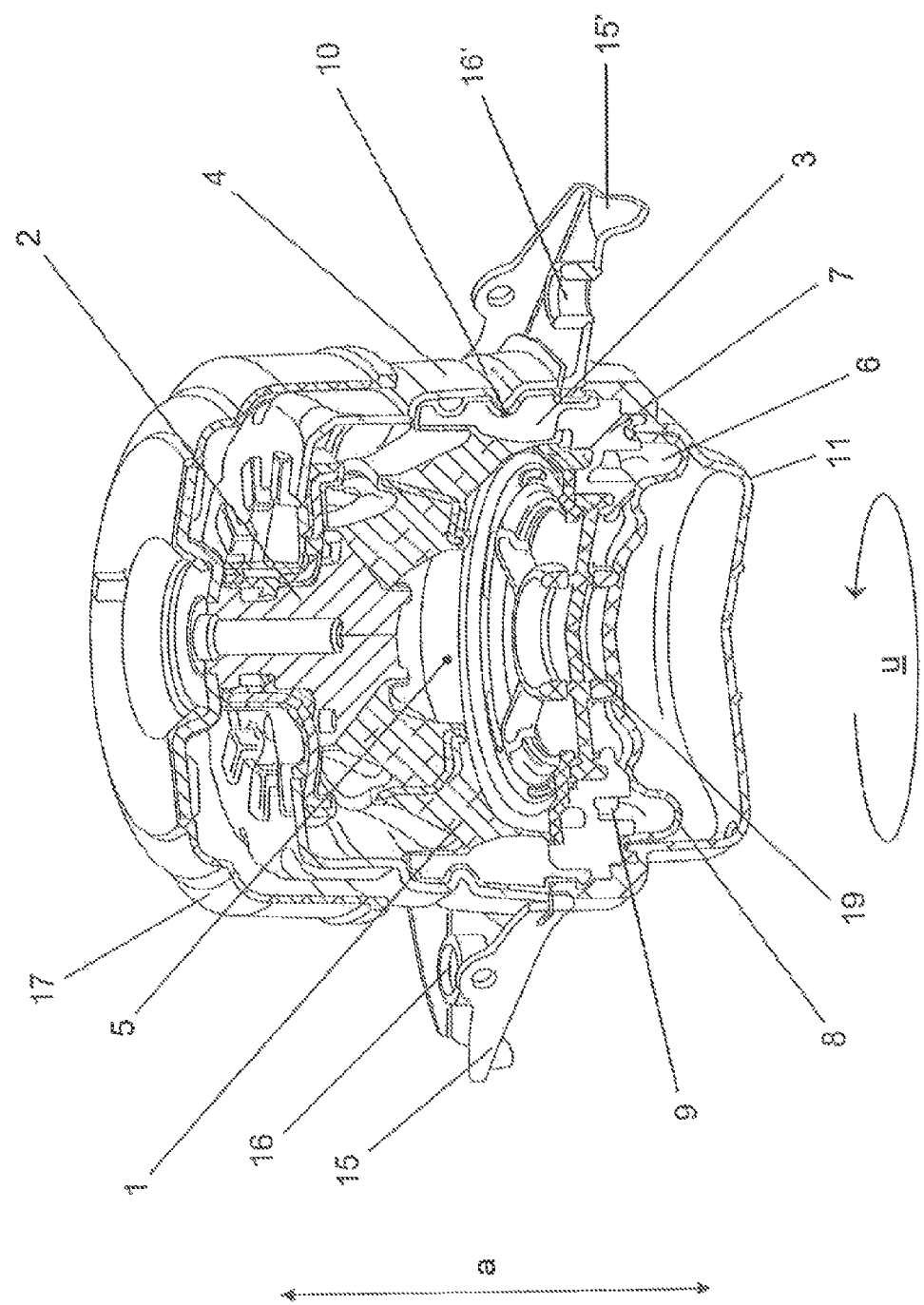

Conversely, in the alternative embodiment according to FIG. 3 shown in a three-dimensional and partially cut diagram, the channel unit 7 is held between the support spring 1 and/or the insertion part 3 reinforcing the support spring 1, respectively, and the cover 11 that is pre-mounted on the housing 4. In all other aspects, the mount illustrated in FIG. 3 is constructed identically to the mount illustrated in the embodiment of FIG. 2, wherein in particular a thread pitch 10 is here also formed on the outside circumference of the support spring 1 and a contour corresponding to this thread pitch 10 is formed on the inside of the housing 4.

Figure 4:
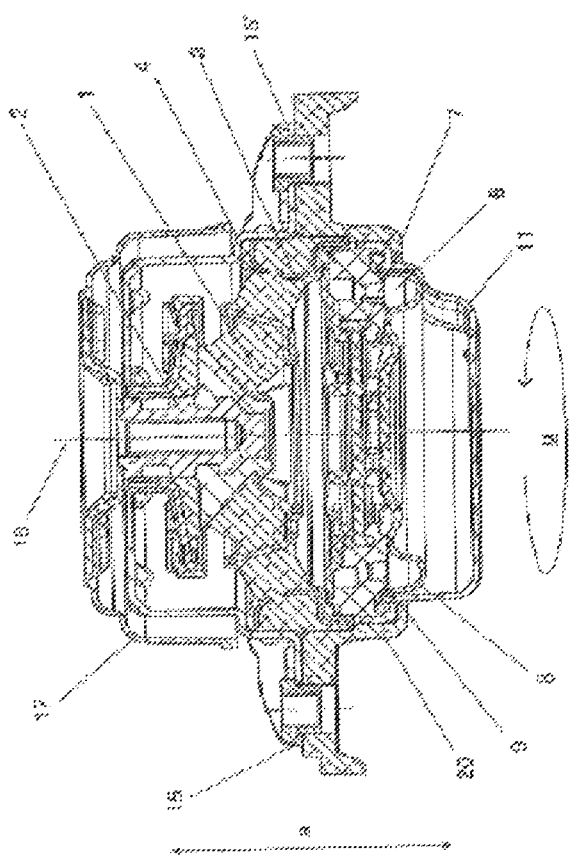

As a comparison with the mount according to the invention, FIG. 4 shows a generic conventional mount in an axial cross-section. As can be seen, the support spring 1 is secured with a separate component 20 arranged below the flange 15, 15' of the housing 4 and likewise constructed with a corresponding flange. For securing the support spring 1, this separate component 20 is deformed in a joining process, so that it has inwardly protruding sections on which the support spring 1 is supported.

LIST OF REFERENCE SYMBOLS

1 Support spring
2 Mount core part
3 Insertion part, reinforcement
4 Housing
5 Working chamber
6 Equalization chamber
7 Channel unit
8 Bellow
9 Channel
10 Thread pitch
11 Cover
12 Cover-side end
13 Axial end
14 Protrusion
15, 15' Flange
16, 16' Opening
17 Cap
18 Mount axis
19 Membrane
20 Separate part
a Axial direction
u Circumferential direction

The invention claimed is:
1. A hydraulically-damping engine mount with a housing (4) comprising
   an elastomeric support spring (1) with at least one insertion part made of metal or plastic received by the housing,
   a mount core part (2) extending in an axial direction (a) in the housing (4) and supported by the support spring (1), and
   two chambers (5, 6) commonly arranged in the axial direction (a) for fluidic damping of a working chamber (5) and an equalization chamber (6) which is spatially separated from the working, chamber (5) by a channel unit (7),
   wherein the working chamber (5) is enclosed by the support spring (1) with the mount core part (2) and the channel unit (7); and the equalization chamber (6) is enclosed by the channel unit (7) and an elastic bellow (8) arranged on the side of the channel unit (7) facing away from the working chamber (5); the working chamber (5) and the equalization chamber (6) are coupled with one another by way of a channel (9) disposed in the channel unit (7),
   wherein a thread pitch (10) is formed on an outside contour of the elastomeric support spring (1) in a circumferential direction (u) of the elastomeric support spring (1) and brought into engagement with a corresponding inside contour of the housing (4),
   wherein the elastomeric support spring (1) comprises a radially outward protrusion (14) on the side of an axial end (13) facing away from a cover (11) which closes the housing (4) on its outside contour, with the protrusion

(14) moving into a corresponding bulge of the housing (4) when the support spring (1) is completely screwed into the housing (4).

2. The hydraulically-damping engine mount according to claim 1, wherein the support spring (1) and the housing (4) are brought into mutual engagement such that elastomeric skin of the support spring (1) is pretensioned in an axial direction (a) and in a radial direction.

3. The hydraulically-damping engine mount according to claim 1, wherein the thread pitch (10) is at least partially reinforced towards the mount axis (18) by the at least one insertion part.

4. The hydraulically-damping engine mount according to claim 1, wherein the outside contour of the support spring (1) in the region of the thread pitch (10) is formed entirely by the elastomer of the support spring (1).

5. The hydraulically-damping engine mount according to claim 1, wherein the at least one insertion part (3) is completely vulcanized into the elastomer of the support spring (1).

6. The hydraulically-damping engine mount according to claim 1, wherein the channel (9) is constructed as a continuous flow channel extending on a circumference of the channel unit (7).

7. The hydraulically-damping engine mount according to claim 1, wherein the channel unit (7) is constructed as a nozzle plate and the channel (9) is constructed as a nozzle channel extending in the axial direction (a) through the nozzle plate.

8. The hydraulically-damping engine mount according to claim 1, wherein the outside contour of the support spring (1) is wetted with a lubricant.

9. The hydraulically-damping engine mount according to claim 1, wherein the thread pitch (10) on the outside contour of the support spring (1) brought into engagement with the corresponding inside contour of the housing (4) are constructed so that an overlap of approximately 2 mm exists between the support spring (1) and the housing (4) over the entire circumference of the mount in the axial direction (a).

10. The hydraulically-damping engine mount according to claim 1, wherein the channel unit (7) is held by an end (12) of the at least one insertion part (3) deformed to form a radially inwardly oriented collar, wherein the deformed end (12) protrudes in an axial direction (a) from the housing (4) on a side of a cover (11).

11. The hydraulically-damping engine mount according to claim 1, wherein the housing (4) comprises a flange (15, 15') having a corresponding opening (16, 16') for mounting the mount at an installation location.

12. The hydraulically-damping engine mount according to claim 1, wherein the housing (4) is closed on the side of the bellow (8) by a cover (11) made of metal or plastic for protecting the bellow (8).

13. The hydraulically-damping engine mount according to claim 1, wherein the housing (4) is closed on the side of the bellow (8) by a cover (11) and on an opposite side the housing (4) is covered with a cap (17).

* * * * *